United States Patent [19]

Petri et al.

[11] Patent Number: 4,651,253
[45] Date of Patent: Mar. 17, 1987

[54] SHUNTING ELEMENT

[75] Inventors: Günther F. Petri, Sandhausen; Botho Ziegenbein, Neckarsteinach, both of Fed. Rep. of Germany

[73] Assignee: Brown, Boveri & Cie AG, Mannheim, Fed. Rep. of Germany

[21] Appl. No.: 756,395

[22] Filed: Jul. 17, 1985

[30] Foreign Application Priority Data

Jul. 17, 1984 [DE] Fed. Rep. of Germany ....... 3426200

[51] Int. Cl.4 ............................................. H02H 1/00
[52] U.S. Cl. ...................... 361/124; 361/55; 361/56
[58] Field of Search ................. 361/56, 55, 124, 104, 361/41; 429/61

[56] References Cited

U.S. PATENT DOCUMENTS

| 3,343,058 | 9/1967 | Deschamps et al. | 361/56 |
| 3,402,325 | 9/1968 | Minks | 361/56 |
| 4,011,366 | 3/1977 | Bones et al. | 429/61 |
| 4,249,224 | 2/1981 | Baumbach | 361/124 |

Primary Examiner—Patrick R. Salce
Assistant Examiner—Mark D. Simpson
Attorney, Agent, or Firm—Herbert L. Lerner; Laurence A. Greenberg

[57] ABSTRACT

A shunting element includes first and second electrical terminals for shunting an electrical component, a semiconductor component, and at least two electrically conducting parts partly formed in springs being electrically conductingly connected between the semiconductor component and one of the electrical terminals, the terminals being connected to each other with a low resistance through the electrically conducting parts when a current flows which raises the temperature in the semiconductor component to a given value.

5 Claims, 4 Drawing Figures

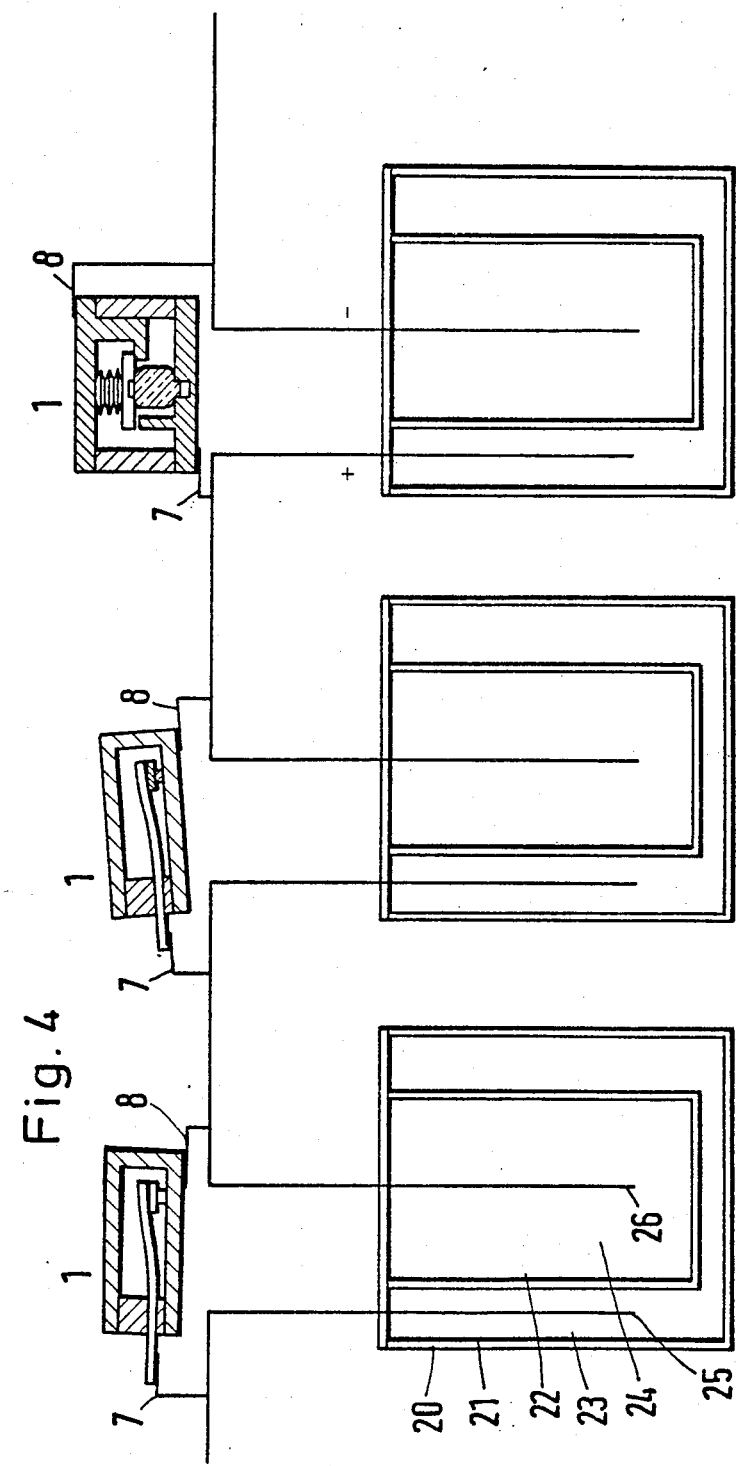

SHUNTING ELEMENT

The invention relates to a shunting element with two electrical terminals for shunting an electric component, especially a rechargeable electrochemical storage cell.

Such shunting elements are particularly applicable to high-temperature batteries which are constructed of rechargeable electrochemical storage cells. In such a case the shunting elements serve for shunting storage cells. The operation of the storage cells has been disturbed and they must therefore be separated from the circuit of the high-temperature battery so that the capacity of the battery is not substantially decreased. In high-temperature batteries which are used for vehicles, the need exists to connect many electrochemical storage cells in series and only a few in parallel. The reasons for this are that the energy content of such a battery will generally be smaller than 40 kWh, but the energy content of a single storage cell is larger than 80 Wh. This leads to the conclusion that a vehicle battery must not contain more than 500 storage cells. If a total of 200 volts is to be generated with such a battery with a voltage of about 2 volts for each individual storage cell, 100 storage cells must be connected in series. This means that at most 5 storage cells can be connected in parallel. Since the redundancy with 5 parallel-connected storage cells is not very large, it is advisable to connect as many storage cells as possible in series. Such branches can be connected in parallel. N storage cells are always connected in series to form a branch. M branches with N storage cells each are connected in parallel and form a block. The entire battery is composed of p such series-connected blocks. According to an example discussed below, the battery contains $N \times M \times p$ storage cells.

With the prior art circuit, problems arise if one storage cell of a series circuit becomes defective. In the case of sodium/sulfur storage cells, it has been found that a defect usually occurs if the solid electrolyte develops cracks, so that the reactants which are sodium and sulfur can chemically react with each other directly and voltage is no longer delivered by the storage cell. Such a defective storage cell has a high internal resistance which is usually greater than the ohmic resistance of a storage cell which is intact by a factor of 2. The consequence thereof is that only a very small or no charging or discharging current flows through the branch with the defective storage cell. If the resistance of the defective storage cell is very large, the branch in which the defective storage cell is located fails completely as a power supply. This means that under these conditions, the capacity of the whole battery is smaller than that of an intact battery by a factor $(m-1)/m$.

German Pat. No. (DE-PS) 31 17 385 describes a shunting element which is intended for shunting an individual storage cell. The shunting element is substantially formed by two directly adjacent spaces. The first space is filled with a metal or a metal compound which can be decomposed. At the operating temperature of the storage cell, the metal must be liquid and the metal compound must be decomposable at this temperature. The second space of the shunting element contains the contact surfaces of two electrodes which are disposed at a defined distance from each other. A further electrode is contained in the space, into which the metal or the metal compound is filled. If the resistance of the storage cell becomes high, a voltage reversal at its electrodes comes about and therefore, a voltage reversal at the terminals of the shunting element occurs. The metal or the metal compound contained in the first space is therefore transported into the second space. If the second space is completely filled with the metal or metal compound, the two electrodes disposed in this space are connected by the liquid material in an electrically conducting manner, in such a way that the current flowing through the series circuit now flows through the shunting element. It is a disadvantage of this shunting element that its structure is too elaborate and requires a great deal of space, which is just not available in a high-temperature storage battery that is surrounded by thermal insulation.

It is accordingly an object of the invention to provide a shunting element for an electrical component, especially an electrochemical storage cell, which overcomes the hereinafore-mentioned disadvantages of the heretofore-known devices of this general type, which has small dimensions, is of simple construction and in addition can be produced inexpensively.

With the foregoing and other objects in view there is provided, in accordance with the invention, a shunting element, comprising first and second electrical terminals for shunting an electrical component especially a rechargeable electrochemical storage cell, a semiconductor component, and at least two electrically conducting parts partly formed of springs being electrically conductingly connected between the semiconductor component and one of the electrical terminals, the terminals being connected to each other with a low resistance through the electrically conducting parts when a current flows which raises the temperature in the semiconductor component to a given value.

According to the invention, such a shunting element is connected in parallel to any electrical component which is to be shunted when necessary. In high-temperature storage batteries which are constructed on the basis of sodium and sulfur, the two terminals of a storage cell are connected to each other through such a shunting element.

The shunting element is constructed in such a way that in the case of an intact storage cell which is connected in series with other storage cells, the current flows through the storage cell itself. If there is trouble within the storage cell, such as a fracture of the solid electrolyte made of beta-aluminum oxide, which separates the two rectant spaces from each other, the storage cell assumes a high resistance and the flow of current through the storage cell is interrupted. In such a case, the current is then taken over completely by the shunting element.

In one embodiment of the invention, the shunting element is constructed in such a way that it responds only when the storage cell which it is shunting exhibits a continuous functional disturbance. During normal functioning of the storage cell, only a very small reverse current flows in this case through the shunting element. According to the invention, the shunting element can also be constructed in such a way that it responds if the storage cell is charged to its maximum capacity or is completely discharged. A fully charged cell acquires a high resistance, i.e., only a very small current flows through it. This means that in a series circuit of storage cells, the current flow through the series circuit is interrupted. Not yet fully charged storage cells will not be charged further, so that the total capacity of the storage cells of this series circuit is therefore smaller than that of other series circuits. Through the use of the shunting element according to the invention, when the storage cell reaches its maximum charge, it is shunted until all of the storage cells of the series circuit are charged. Such a shunt is possible and makes sense if the storage cell is discharged to the point that its voltage has reached the value zero. If the circuit through the storage cell is then likewise shunted by the shunting element, a short-circuit current is prevented from flowing through the storage cell. In particular, the shunting prevents a current from being forced on the storage cell which causes the storage voltage to be reversed, so that the voltage becomes negative.

According to the invention, the shunting element is formed by a semiconductor component which is electrically conductingly connected through at least two electrically conducting parts that are partly constructed as springs, to an electrical terminal of the shunting element. Each component, especially each electrochemical storage cell, is shunted by such a shunting element. The shunting elements are disposed together with the storage cell within the battery which is bounded toward the outside by thermal insulation. A temperature of 350° C. prevails in the interior of the battery, which corresponds to the operating temperature of the storage cells. If the resistance of a storage cell becomes high, the entire current of the series circuit flows through the shunting element and especially through its semiconductor component. Therefore, the temperature within the shunting element is increased to about 570° C. or substantially more, so that the glass encapsulation of the semiconductor component begins to melt.

In accordance with another feature of the invention, the semiconductor component is directly connected to the second terminal, and the two electrically conducting parts are in the form of a disk-shaped part formed of a fusing alloy electrically conductingly connected to the semiconductor component and a pre-tensioned contact spring having a first end contacting the disk-shaped part and a second end fastened to the first terminal.

In accordance with a further feature of the invention, there is provided a metallic housing having inner and outer surfaces, the semiconductor component being electrically conductingly connected to the inner surface of the metallic housing, and the second terminal being a rod-shaped conductor fastened to the outer surface of the metallic housing.

In accordance with an added feature of the invention, the disk-shaped part formed of fusing alloy and the semiconductor component are joined together to form a low-resistance shorting element when the temperature rises to at least 570° C.

In accordance with an additional feature of the invention, the disk-shaped part is formed of aluminum or an aluminum alloy.

In accordance with again another feature of the invention, the first terminal is a rod-shaped electrical conductor, and the contact spring is installed in the housing in a pretensioned manner and the second end of the contact spring is brought out of the housing in an insulated manner and is connected to the first terminal outside the housing.

Due to the temperature rise within the shunting element, the disk-shaped part also begins to melt, so that it forms a shorting element together with the semiconductor component. The electrical connection between this shorting element and the electrical terminal continues to be formed by the contact spring.

In accordance with again a further feature of the invention, there is provided a housing having first and second electrically conducting boundary walls disposed opposite each other, the semiconductor component being directly connected to the first boundary wall, and the electrically conducting parts being in the form of a contact spring connecting the semiconductor component to the second boundary wall and at least one cup spring connecting the semiconductor component to the second boundary wall through the contact spring.

In accordance with again an added feature of the invention, the semiconductor component has a first terminal disposed in a recess formed in the first boundary wall and a second terminal disposed in a recess formed in the contact spring, and including a hook-shaped arm of the second boundary wall protruding into the interior of the housing, the contact spring having an edge with a region thereof resting on the hook-shaped arm, and the at least one cup spring being an electrical connection between the contact spring and the second boundary wall.

In accordance with again an additional feature of the invention, there is provided an electrically conducting pin connected to the first boundary wall and protruding into the housing with an end spaced a small distance from the contact spring.

Two insulating boundary walls are disposed between the two electrically conducting boundary surfaces, so that a closed housing is formed. The first terminal is fastened to the outer surface of the first electrically conducting boundary wall and the second electrical terminal of the shunting element is connected to the second electrically conducting wall. If the entire current which normally flows through the storage cell flows through this shunting element, the temperature in the semiconductor component is raised so high that the glass encapsulation of the semiconductor component begins to melt. The tension of the springs is therefore reduced. The now expanding cup spring pushes the contact spring in the direction toward the semiconductor component until it rests against a pin which protrudes into the interior of the housing and is connected in an electrically conducting manner to the second metallic boundary wall. A low-resistance connection is thus formed between the two housing walls or between the terminal elements of the shunting elements fastened thereto.

In accordance with a concomitant feature of the invention, the semiconductor component is a silicon or Zener diode.

If silicon diodes are used as the semiconductor components, they are poled for normal operation of the storage cell, so that only a small reverse current flows through them. If the storage cell acquires a high resistance and if a voltage reversal occurs at its terminals, then the semiconductor component is poled in the flow direction, so that the entire current can be taken over by the shunting element.

However, for decreasing the reverse current at elevated operating temperatures, it is better to use a semiconductor element of gallium arsenide or gallium phosphide.

Other features which are considered as characteristic for the invention are set forth in the appended claims.

Although the invention is illustrated and described herein as embodied in a shunting element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4 a cross-sectional view of several storage cells in a series circuit, each of which is equipped with a shunting element.

Figure 1:
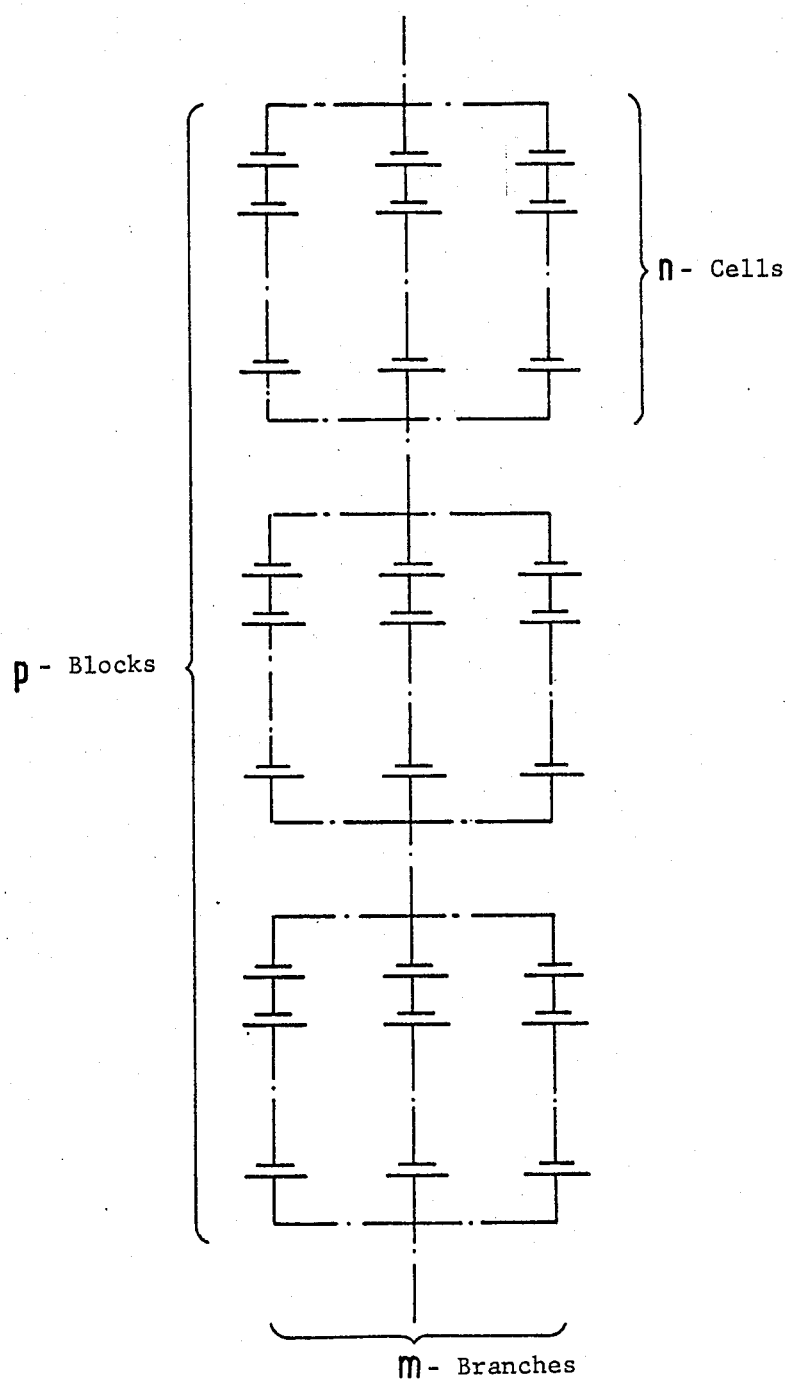
FIG. 1 is a schematic circuit diagram of a high-temperature storage battery.

Referring now to the figures of the drawings in detail and first, particularly to FIG. 1 thereof, there is seen a circuit of N storage cells which are always connected in series to form a branch. M branches with N storage cells each are connected in parallel to form a block. The entire battery is formed of p series-connected blocks. According to FIG. 1, the battery contains $N \times M \times p$ storage cells.

Figure 2:
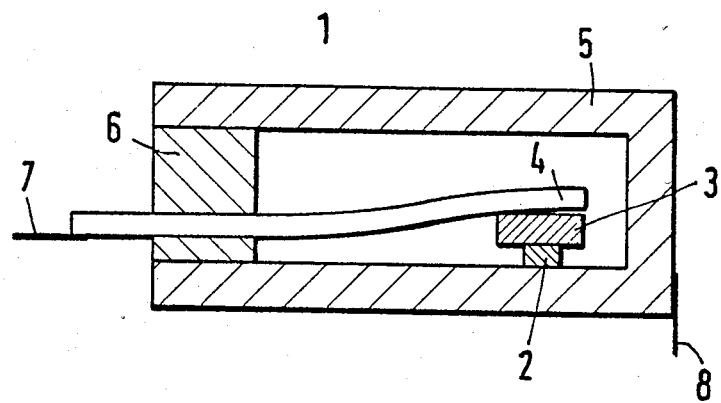
FIG. 2 is a diagrammatic cross-sectional view of a shunting element according to the invention.

In FIG. 2 a shunting element 1 is shown which is formed substantially by a semiconductor component 2, a disk-shaped part 3 and a contact spring 4. The shunting element 1 is bounded or defined toward the outside by a metallic housing 5 which is cup-shaped. The semiconductor component 2 is in the form of a silicon diode or a Zener diode. The component 2 is disposed on the inner surface of the metallic housing 5 and a first electrical terminal thereof is directly connected thereto in an electrically conducting manner. The second electrical terminal of the semiconductor component 2 is connected to the contact spring through the disk-shaped part 3. This part is made of a fusing alloy, such as an aluminum alloy. A first end of the contact spring 4 is disposed on the surface of the disk-shaped part 3, so that an electrically conducting connection exists between the part 3 and the spring 4. The contact spring 4 is installed in such a way that its first end pushes firmly against the surface of the disk-shaped part 3. In particular, the contact spring 4 is installed inside the housing 5 in the pre-tensioned condition. A second end of the contact spring 4 is brought out of the housing 5 through a seal 6. The seal 6 is made of an insulating material which is resistent to temperatures of 580° C. and more. The second end of the contact spring extends outward and is connected to a first terminal element 7 of the shunting element in an electrically conducting manner. The connecting element 7 is formed, for instance, by a rod-shaped conductor. A second terminal element 8 of the shunting element 1 is likewise formed by a rod-shaped conductor, which is connected to the outer surface of the housing 5 in an electrically conducting manner. If the entire current which normally flows through the storage cell is assumed or taken over by this shunting element 1, this causes a temperature rise which is at least 570° C. or more, at least in vicinity of the semiconductor element 2 and the disk-shaped part 3.

Due to this temperature rise, the glass encapsulation around the semiconductor component and the part 3 begins to melt. At the same time, the semiconductor component 2 is pushed into the part 3 by the contact spring 4, so that the contact spring is connected to the boundary wall by the shorting element formed in this way. A low-resistance electrically conducting connection is therefore formed between the terminal elements 7 and 8 of the shunting element.

Figure 3:
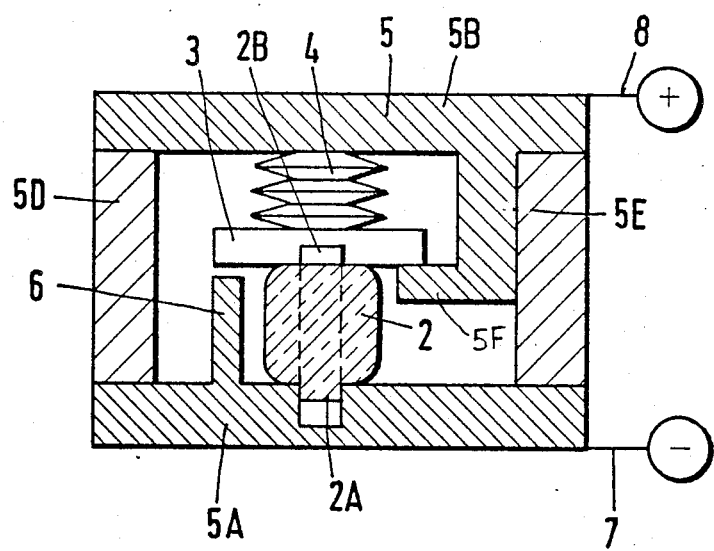
FIG. 3 is a cross-sectional view of another embodiment of the shunting element.

FIG. 3 shows a variation of the shunting element 1, which is substantially formed by a semiconductor component 2, a contact spring 3 and a cup spring 4. The semiconductor component 2 is disposed within a prismatic housing 5. The housing 5 has first and second opposite electrically conducting boundary walls 5A and 5B, while the remaining boundary walls 5D and 5E are made of insulating material. A first terminal 2A of the semiconductor component is connected directly to the surface of the electrically conducting boundary wall 5A. The terminal 2A is inserted in an electrically conducting manner into a depression formed in the surface of the boundary wall 5A. A second terminal 2B of the semiconductor component is inserted in an electrically conducting manner into a recess formed in the contact spring 3. The outer rim of the disk-shaped contact spring 3 is connected to a hook-shaped arm 5F of the second electrically conducting boundary wall 5B of the housing 5, which protrudes into the interior of the housing 5. The cup spring 4 is installed in tensioned condition between the surface of the disk-shaped contact spring 3 and the inner surface of the boundary wall 5B. Due to the above-described measures, the terminal 2B of the semiconductor component 2 is firstly connected to the conducting boundary wall 5B through the contact spring 3 and the arm 5F, and secondly through the contact spring 3 and the cup spring 4, in an electrically conducting manner. A pin 6 extends parallel to the surface of the boundary wall 5D. The pin 6 protrudes into the interior of the housing 5 and is connected to the boundary wall 5A in an electrically conducting manner. The pin 6 is inserted into the interior so far that it ends at a small distance from the contact spring 3. The first electrically conducting terminal element 7 is connected to the boundary wall 5A of the housing 5. In the embodiment illustrated in FIG. 3, the element 7 is formed by a rod-shaped conductor. The second electrical terminal element 8 is fastened to the outside of the boundary surface 5B and is likewise formed by a rod-shaped conductor.

If the total current flowing through a storage cell is assumed or taken over by this shunting element, then a temperature rise to values of 570° C. and more also occurs there, especially in vicinity of the semiconductor component 2, whereupon the glass encapsulation of the semiconductor component begins to melt. The strength of the glass encapsulation, which keeps the cup spring 4 in the tensioned state between the contact spring 3 and the boundary wall 5B, therefore decreases. Due to the expanding cup spring 4, the contact spring 3 is pushed in the direction toward the pin 6 until it rests on the surface thereof. An electrically conducting low-resistance connection is therefore formed between the electrically conducting boundary wall 5A and the boundary wall 5B which is also electrically conducting.

In both embodiments described with regard to FIGS. 2 and 3, it is possible to provide the semiconductor components 2 as Zener diodes, so that the shunting element takes over the current through the storage cell not only if the storage cell is defective, but also if the storage cell is charged to its maximum capacity or its voltage has reached the value zero. Zener diodes are used which have a nominal voltage that corresponds to the maximum charging voltage of the storage cells and a forward voltage which is very very small, so that the shunting element can also temporarily take over the current if the above-mentioned conditions prevail.

In FIG. 4, three series-connected storage cells are shown. Each storage cell 20 is shunted by a shunting element 1. Two of the storage cells 20 are each equipped with a shunting element which is shown in FIG. 2 and is explained in detail in the corresponding description thereof, while the third storage cell is connected to the shunting element which is shown in FIG. 3 and is explained in the corresponding description thereof. The two embodiments are equivalent and can be used as required in the manner shown in FIG. 4. Each storage cell 20 is bounded toward the outside by a metallic, cup-shaped housing 21. A similarly cup-shaped solid electrolyte 22 of beta-aluminum oxide is disposed inside the housing 21. A cathode space 23 is disposed between the solid electrolyte 22 and the metallic housing 21 in the illustrated embodiment, while an anode space 24 is located inside the solid electrolyte 22. The solid electrolyte is filled with non-illustrated sodium. Non-illustrated sulfur which serves as the second reactant is disposed in the cathode space 23. A current collector 25, 26 extends into each reactant space 23, 24. The current collector 25 is connected to the terminal element 7 of a respective shunting element and the current collector 26 is connected to the terminal element 8 of the respective shunting element, in an electrically conducting manner. As long as the storage cells 20 are fully operable, the current flows through them. As already mentioned above, the shunting elements 1 are installed in such a way that only a very small reverse current flows through the element if the cell is fully operable. If the semiconductor components contained in the shunting elements 1 are Zener diodes, the shunting elements can take over the current if the storage cell is fully charged or fully discharged. This current-takeover, however, is only for a short time. Only if a defect occurs inside the storage cell 20 is the circuit permanently shorted by the shunting element 1.

The foregoing is a description corresponding in substance to German application No. P 34 26 200.8, filed July 17, 1984, the International priority of which is being claimed for the instant application, and which is hereby made part of this application. Any material discrepancies between the foregoing specification and the aforementioned corresponding German application are to be resolved in favor of the latter.

We claim:

1. Shunting element, comprising first and second electric terminals, a metallic housing having inner and outer surfaces, a semiconductor component in the form of a silicon or a Zener diode directly electrically connected to one of said inner surfaces of said metallic housing, a disk-shaped part formed of fusing alloy directly connected to said semiconductor component, and a pre-tensioned contact spring having a first end electrically conductingly connected to said disk-shaped part and a second end fastened to said first terminal, said disk-shaped part and said semiconductor component being melted and joined together to form a low-resistance shorting element when the temperature in said shorting element rises to at least 570° C., and said second terminal being a rod-shaped conductor fastened to one of said outer surfaces of said metallic housing.

2. Shunting element according to claim 1, wherein said disk-shaped part is formed of an aluminum alloy.

3. Shunting element, comprising a housing having first and second electrically conducting boundary walls disposed opposite each other defining an interior of said housing, first and second electrical terminals each being connected to a respective one of said boundary walls, a semiconductor component directly connected to said first boundary wall, electrically conducting parts in the form of a contact spring and a cup spring, said semiconductor component having a first terminal disposed in a recess formed in said first boundary wall and a second terminal disposed in a recess formed in said contact spring, said second boundary wall having a hook-shaped arm protruding into the interior of said housing, said contact spring having an edge with a region thereof resting on said hook-shaped arm, said cup spring forming an electrical connection between said contact spring and said second boundary wall, and said first boundary wall having an electrically conducting pin protruding into the interior of said housing with an end being spaced at a distance from said contact spring by said semiconductor component and being contacted by said contact spring when said semiconductor component melts due to a temperature rise therein to a given value.

4. Shunting element according to claim 3, wherein said semiconductor component is a silicon diode.

5. Shunting element according to claim 3, wherein said semiconductor component is a Zener diode.

* * * * *